United States Patent [19]

Schulz

[11] Patent Number: 5,052,786
[45] Date of Patent: Oct. 1, 1991

[54] BROADBAND FARADAY ISOLATOR

[75] Inventor: Peter A. Schulz, North Andover, Mass.

[73] Assignee: Massachusetts Institute of Technology, Cambridge, Mass.

[21] Appl. No.: 488,690

[22] Filed: Mar. 5, 1990

[51] Int. Cl.$^5$ ................................................. G02F 1/09
[52] U.S. Cl. ..................................... 359/484; 359/500
[58] Field of Search ..................... 350/96.13, 376, 377, 350/378, 375, 387, 403, 405

[56] References Cited

U.S. PATENT DOCUMENTS

| | | | |
|---|---|---|---|
| 4,178,073 | 12/1979 | Uchida et al. | 350/377 |
| 4,239,329 | 12/1980 | Matsumoto . | |
| 4,272,159 | 7/1981 | Matsumoto . | |
| 4,375,910 | 3/1983 | Seki | 350/377 |
| 4,548,478 | 10/1985 | Shirasaki | 350/377 |
| 4,668,052 | 5/1987 | Shirasaki | 350/405 |
| 4,712,880 | 12/1987 | Shirasaki | 350/377 |
| 4,893,890 | 1/1990 | Lutes | 350/378 |
| 4,981,341 | 1/1991 | Brandle, Jr. et al. | 350/387 |
| 4,988,170 | 1/1991 | Buhrer | 350/405 |

FOREIGN PATENT DOCUMENTS 54-078153 6/1979 Japan .
2143337A 2/1985 United Kingdom .

OTHER PUBLICATIONS

Shiraishi et al., "Cascaded Optical Isolator Configuration Having High-Isolation Characteristics Over a Wide Temperature and Wavelength Range", Optics Letters, vol. 12, No. 7, Jul. 1987, pp. 462-464.
Iwamura, et al., "A Compact Optical Isolator Using a $Y_3Fe_5O_{12}$ Crystal for Near Infra-Red Radiation", Optical and Quantum Electronics 10 (1978) pp. 393-398.
Johnston et al., "Design and Performance of a Broad--Band Optical Diode to Enforce One-Direction Traveling-Wave Operation of a Ring Laser", IEEE Journal of Quantum Electronics, vol. QE-16, No. 4, Apr., 1980, pp. 483-488.
Matsumoto et al., "Temperature-Stable Faraday Rotator Material and Its Use in High-Performance Optical Isolators", Applied Optics, vol. 25, No. 12, Jun. 15, 1986, pp. 1940-1945.
Gauthier et al., "Simple, Compact, High-Performance Permanent-Magnet Faraday Isolator", Optics Letters, vol. 11, No. 10, Oct. 1986, pp. 623-625.
Shirasaki et al., "Compact Optical Isolator for Fibers Using Birefringent Wedges", Applied Optics, vol. 21, No. 23, Dec. 1, 1982, pp. 4296-4299.
Shirasaki et al., "Compact Optical Isolator for Fibers Suitable for Operating in the 1.3-1.5-um Wavelength Region", Conference on Lasers and Electro-Optics, 1983.
Chikama et al., "Distributed-Feedback Laser Diode Module with a Novel and Compact Optical Isolator for Gigabit Optical Transmission Systems", Conference on Lasers and Electro-Optics, 1983.
Toshihiko Yoshino, "Compact and Highly Efficient Faraday Rotators Using Relatively Low Verdet Constant Faraday Materials", Japanese Journal of Applied Physics, vol. 19, No. 4, Apr. 1980, pp. 745-749.
George Lutes, "Optical Isolator System for Fiber-Optic Uses", Applied Optics, vol. 27, No. 7, Apr. 1, 1988, pp. 1326-1328.
Jopson et al., "Bulk Optical Isolator Tunable from 1.2 um to 1.7 um", Electronics Letters, Aug. 29th, 1985, vol. 21, No. 18, pp. 783-784.

Primary Examiner—Bruce Y. Arnold
Assistant Examiner—Martin Lerner
Attorney, Agent, or Firm—Fish & Richardson

[57] ABSTRACT

A method of manufacturing a Faraday isolator which is wavelength-independent over an extended predetermined range of wavelengths and provides high isolation over the extended wavelength range.

10 Claims, 4 Drawing Sheets

BROADBAND FARADAY ISOLATOR

The Government has rights in this invention pursuant to contract Number F19628-85-C-0002 awarded by the Department of the Air Force.

BACKGROUND OF THE INVENTION

This invention relates to optical isolators.

An optical isolator allows light to pass through it substantially unattenuated in one direction (forward), while highly attenuating the intensity of light passing through it in the other direction (reverse). Optical isolators are therefore used to isolate light sources, typically lasers, from reflections and to prevent parasitic oscillations in high gain optical amplifier chains. For example, single-frequency laser diodes require greater than 60 dB isolation in coherent optical communications and optical sensing applications.

A Faraday rotator is commonly used as a key component to provide the isolation. A Faraday rotator has the property that it rotates the polarization vector of light passing through it in the same sense or chirality (clockwise or counter-clock-wise) regardless of the direction in which the light passes through the Faraday rotator. For example, if a Faraday rotator were constructed to rotate the polarization vector of the light passing through it in a given direction, for example clock-wise by 45°, passing that light back through the Faraday isolator in the opposite direction would not cause the polarization vector of the light to be rotated counter-clockwise by 45° back to its original orientation. Instead, the polarization vector of the light would be rotated an additional 45° clock-wise, resulting in light whose polarization vector would then be perpendicular to its original orientation.

This behavior differs from the behavior of other optically active rotators, such as quartz, in which the sense or chirality of rotation of the polarization vector of light is determined by the direction of the light as it passes through the optically active rotator. Therefore, if the polarization vector of light passing through quartz in a given direction is rotated, for example clock-wise 45°, passing that light back through the quartz rotator in the reverse direction will result in the polarization vector of the light being rotated counter-clock-wise 45° back to its original orientation.

A Faraday rotator is constructed by placing a magneto-optical material within a magnetic field. When such a material is exposed to a magnetic field, the material causes the polarization vector of light passing through it to rotate. The amount of rotation is a function of the material itself, the wavelength of the light passing through the rotator, the applied magnetic field strength and the ambient temperature of the material.

Typically an optical isolator is constructed by placing a 45° Faraday rotator, that is, a Faraday rotator which rotates the plane of polarization by 45°, between two polarizers oriented such that their polarization axes are at 45°. The orientation of the light passing through the first polarizer is rotated 45° upon passing through the Faraday rotator in the forward direction. Since the second polarizer is oriented at 45° to the first polarizer, light with that new polarization can pass through. Light passing in a reverse direction through the second polarizer undergoes an additional 45° rotation upon passing through the Faraday rotator. This results in its polarization vector of the light being oriented 90° to the orientation of its polarization vector in the forward direction. This additional rotation prevents the light from passing through the first polarizer in the reverse direction.

Dispersion causes the amount of rotation produced by a Faraday rotator to be wavelength dependent. Because of this wavelength sensitivity, a typical isolator provides good isolation over a narrow band of wavelengths and the isolator generally needs to be tuned to provide good isolation over a wide range of wavelengths. That is, for example, if the Faraday rotator were constructed to rotate the polarization of light at wavelength $\lambda_1$ by 45°, at $\lambda_2$ some wavelength away from $\lambda_1$, the Faraday rotator might only rotate the polarization 32°. Therefore the light passing through the rotator in the reverse direction would only be rotated 32° relative to the polarization selected by the second polarizer. The polarization of this light is oriented 77° away from the orientation selected by the first polarizer. Of light propagating in the reverse direction a fraction, equal to $\cos^2(77°) = 0.05$, would be transmitted by the first polarizer, corresponding to 13 dB of isolation. In order to provide isolation at $\lambda_2$, the Faraday rotator would have to be adjusted to produce a 45° rotation at $\lambda_2$ or the polarizer would have to be rotated, but in doing either, the isolator would lose the ability to isolate at $\lambda_1$. Most currently produced optical isolators will provide good isolation over a narrow wavelength range, for example, greater than 30 dB over 30 nm. Several methods may be used to tune an isolator, that is, switch the wavelength of maximum isolation from one wavelength to another. The amount of Faraday rotation can be changed by: varying the magnetic field applied to the rotator; rotating one of the polarizers to a new orientation; or altering the temperature of the rotator. This tuning of wavelengths takes time (one second or longer) and is therefore inappropriate when a rapid switching of wavelengths is desired or when simultaneous isolation at many different wavelengths is required.

Iwamura and co-workers have reported an isolator ("A compact optical isolator using a $Y_3Fe_5O_{12}$ crystal for near infra-red radiation", *Optical and Quantum Electronics*, 10 (1978) p. 393) made by placing a 45° YIG Faraday rotator adjacent to a 45° optically active quartz rotator and placing both between a pair of 90° crossed polarizers. Since their device was only partially dispersion compensated, it provided 23 dB of isolation only over a wavelength range of 1.1–1.4 μm.

Johnston and Proffit (*IEEE Journal of Quantum Electronics*, QE-16, (1980) p. 483) reported a dispersion compensated unidirectional device for a ring-laser having a Faraday rotator in conjunction with an optically active rotator to give a net 0° rotation in the forward direction and a small rotation in the reverse direction. Although this device used dispersion compensation to work over a broad wavelength range, it was not an isolator.

SUMMARY OF THE INVENTION

The invention relates to a dispersion compensated Faraday isolator which operates over a broad range of wavelengths and which provides high isolation over that wavelength range and its method of making. The apparatus comprises a first polarizer to polarize light passing through it such that the light is polarized in a first orientation, and a Faraday rotator positioned so that the light polarized by the first polarizer passes through the Faraday rotator causing the polarization of the light to be rotated to a second orientation at an angle Θ relative to the first orientation. The angle is proportional to the length of the material of the Faraday rotator. Adjacent the Faraday rotator is an optically active material so that the light passing through the Faraday rotator passes through the optically active material causing the polarization of the light to be rotated to a third orientation at an angle $\Theta_{OAR}$, relative to the second orientation. A second polarizer receives the rotated light from the optically active material and the axis of polarization of the second polarizer is oriented so that the polarizer is aligned at an angle $\delta$ with respect to the orientation of the polarization of the first polarizer. The angle $\delta$ equals $\Theta_{OAR} + \frac{1}{4}\pi$. It is important to note that the ordering of the optically active rotator and the Faraday rotator between the two polarizers is immaterial to the operation of the isolator.

Other advantages and features will become apparent from the following description of the preferred embodiment and from the claims.

DESCRIPTION OF THE PREFERRED EMBODIMENT

A more complete understanding of the invention may be obtained from the following detailed description when taken in conjunction with the drawings, in which.

Figure 1:
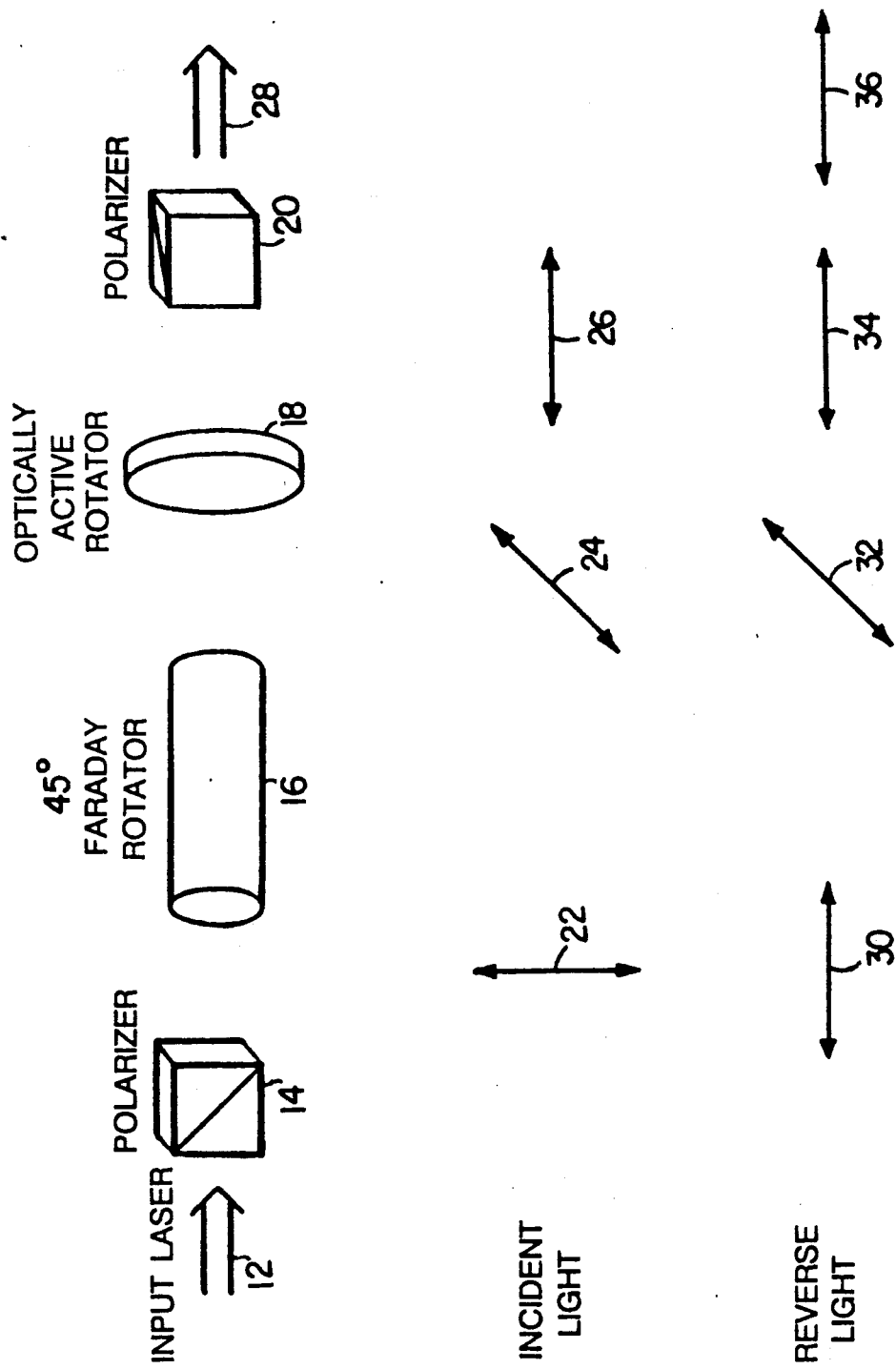
FIG. 1 is a schematic diagram of a prior art Faraday isolator incorporating an optically active rotator for dispersion compensation.

Referring to FIG. 1, a broadband Faraday isolator 10 includes a first polarizer 14 which polarizes light incident upon it 12 in a given orientation 22. Adjacent to this first polarizer 14 is a Faraday rotator 16. The Faraday rotator 16 rotates the polarization vector of the light 22, assume for purposes of example, clock-wise a given amount, to a new orientation 24. This light then passes through an optically active rotator 18 which again causes the orientation of the polarization vector to rotate, again for purposes of example, clock-wise an additional amount to a new orientation 26. A second polarizer 20 is oriented so as to let the polarized light of the new orientation 26 pass through 28. The ordering of the optically active rotator and the Faraday rotator between the two polarizers is immaterial to the operation of the isolator.

Any light which is propagated in the reverse direction with a component of its polarization in the proper orientation 34 will pass through the second polarizer 20. That light then passes through the optically active rotator 18 in the reverse direction and its polarization is rotated counter-clock-wise to an orientation 32 equal to the orientation of the polarization vector 24 of the light passing in the forward direction through the Faraday rotator 16. However, that light, passing through the Faraday rotator 16 in the reverse direction, has its polarization vector rotated clock-wise to an orientation 30 which is perpendicular to the orientation of the first polarizer 14. This prevents light traveling in the reverse direction from passing through the first polarizer 14.

For the device just described to provide isolation over a broad range of wavelengths, the dispersion of the Faraday rotator should be substantially compensated by the dispersion of the optically active rotator. For example, both the Faraday rotator and the optically active rotator rotate the polarization of light less at longer wavelengths than at shorter wavelengths. By setting the amount of rotation caused by both the Faraday rotator and the optically active rotator to be equal at the central wavelength $\lambda_c$, the net rotation for light passing through the combination of the optically active element and the Faraday rotator in the reverse direction will be $0°$ at $\lambda_c$. In this way, the dispersion in the net rotation due to the combination of optically active element and Faraday rotator may be less than the dispersion of either the optically active element or the Faraday rotator individually. However, there will still be a linear dependence of the rotation of polarization on wavelength for wavelengths near the central wavelength. This is the prior art approach to using an optically active rotator for dispersion compensation.

Figure 2:
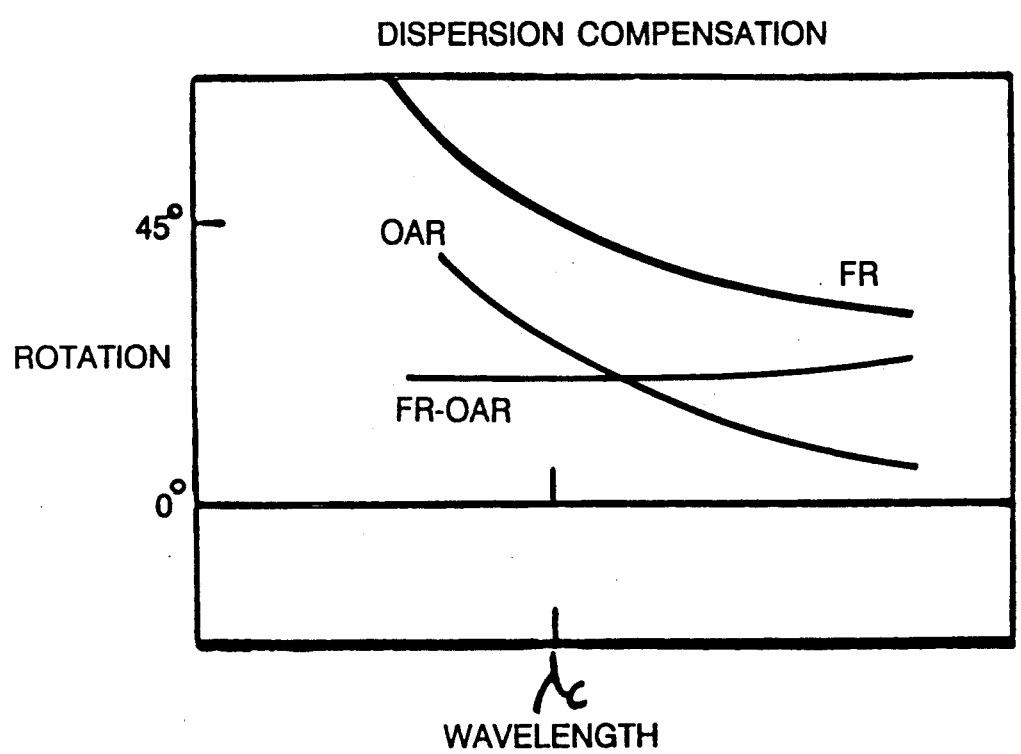
FIG. 2 is a depiction of typical rotation versus wavelength curves for a Faraday rotator and an optically active rotator of the invention.

Much better dispersion compensation can be achieved by selecting the amount of polarization rotation by the optically active rotator such that the slopes of the dispersion curves for both the Faraday rotator and the optically active rotator at the central wavelength are approximately identical, as shown in FIG. 2. When this is done, the polarization rotation in the reverse direction is linearly independent of wavelength (curve FR-OAR). By placing the first polarizer orthogonal to the amount of rotation indicated by the FR-OAR curve, the transmission in the reverse direction will be very small for a wide range of wavelengths.

For example, if the Faraday rotator causes the polarization vector of the light to rotate by $57°$ at $\lambda_1$, $45°$ at $\lambda_2$ and $38°$ at $\lambda_3$, the optically active rotator should cause the light passing in the reverse direction to rotate by $12°$ more at $\lambda_1$ than at $\lambda_2$ and by $7°$ less at $\lambda_3$ than at $\lambda_2$. In this way the dispersion relation of the Faraday rotator is compensated for by the dispersion relation of the optically active material. The net result is that the polarization vector of the light passing in the reverse direction to the first polarizer is unchanged by a change in wavelength.

To understand how this can be accomplished, one must first understand that it is line splitting, caused by the field of the crystal in optically active materials and caused by the Zeeman effect resulting from the applied magnetic field in Faraday rotators, which causes a slight shift in the absorption peaks of the material for right-hand and left-hand circularly polarized light. This shift results in a difference in the index of refraction for two orthogonal circular polarizations. This difference in the index of refraction causes the rotation of the polarization vector.

To understand the effect of dispersion quantitatively, the dispersion for a Faraday rotator or an optically active rotator can be written as the sum of the contributions of a number of absorption peaks in the material. That is:

$$\rho = \omega^2 \Sigma_i \frac{A_i}{\omega_i^2 - \omega^2} + \Sigma_{i,j} \frac{B_{ij}}{(\omega_i^2 - \omega^2)(\omega_j^2 - \omega^2)} \quad (1)$$

where $\rho$ is the polarization rotation per unit length, $\omega$ is the angular frequency of light, $\omega_i$ are the angular frequencies of the absorption features, and A and B are the material dependent constants (which in the case of a Faraday rotator are proportional to the magnetic field applied).

The polarization rotation per unit length can be approximated using the first term in the above expression, called the single oscillator model. This approximation leads to the expression for the amount of polarization rotation Θ for any optically active material or Faraday rotator given by:

$$\Theta = \frac{A_o \lambda_o^2}{\lambda^2 - \lambda_o^2} L \tag{2}$$

where $A_o$ and $\lambda_o$ are material dependent constants, $\lambda$ is the vacuum wavelength of the light, and L is the length of the material.

Generally the Faraday rotator and the optically active rotator will not have the same dispersion relation. The wavelength independence of the Faraday isolator is a function of how well the Faraday rotation and the optically active element rotation are matched as a function of wavelength. To obtain high isolation for a broad range of wavelengths around an arbitrary center wavelength when the Faraday rotator and the optically active rotator do not have the same dispersion relation, the net polarization rotation in the reverse direction should be linearly independent of wavelength. That is:

$$\frac{d(\Theta_{FR} - \Theta_{OAR})}{d\lambda}\bigg|_{\lambda=\lambda_c} = 0 \tag{3}$$

where the angle $\Theta_{OAR}$ is the polarization rotation for the optically active rotator and $\Theta_{FR}$ is the polarization rotation for the Faraday rotator both measured at $\lambda_c$. The published values of wavelength dependence are sufficient to determine the wavelength dependence of the isolation of a Faraday isolator having 40 dB or less of isolation.

Figure 3:
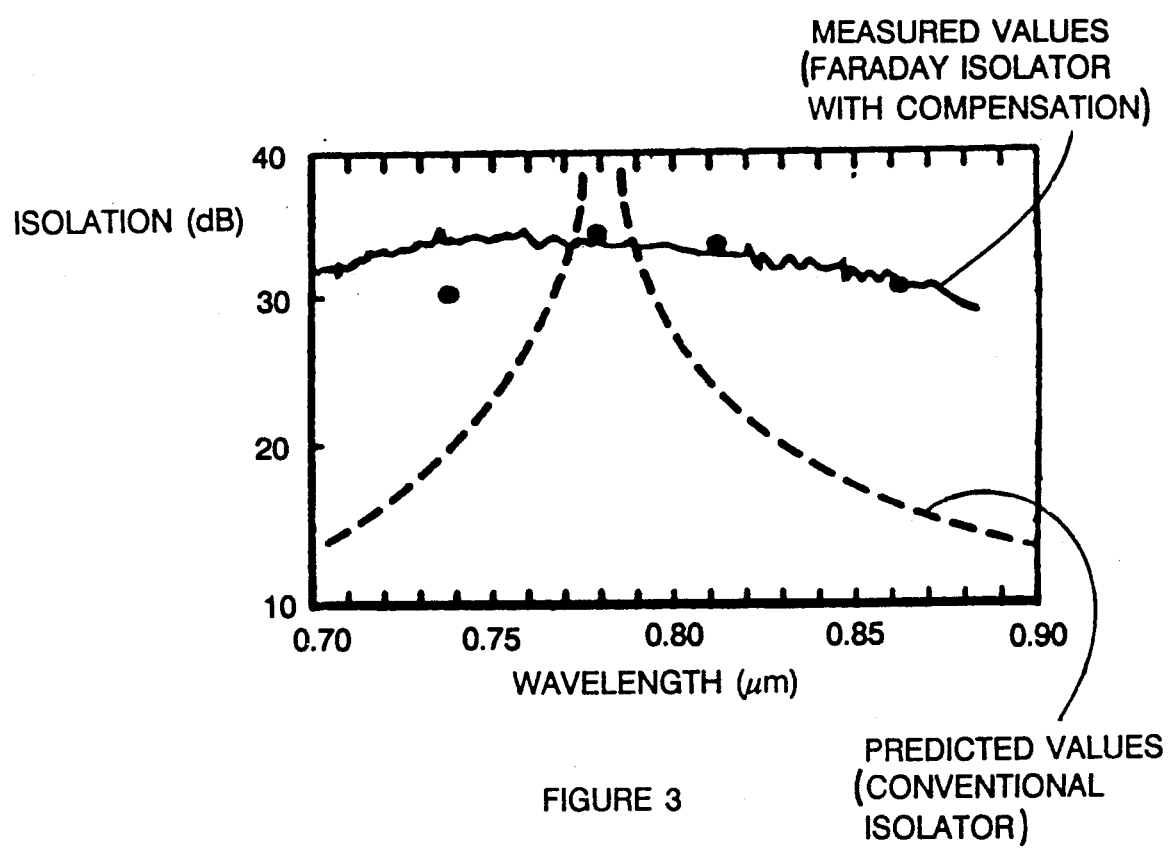
FIG. 3 is a comparison of typical isolation versus wavelength curves for the invention and the prior art.

By combining the two previous relationships, (eqns. 2 and 3), and assuming a Faraday rotation of 45° at the center wavelength, the polarization angle $\Theta_{OAR}$ required by the optically active rotator to compensate for the rotation by the Faraday rotator is given by the expression:

$$\Theta_{OAR} = \tfrac{1}{4}\pi \frac{\lambda_c^2 - \lambda_{o,OAR2}}{\lambda_c^2 - \lambda_{o,FR2}} \tag{4}$$

where $\lambda_c$ is the center wavelength of the range of wavelength independence, $\lambda_{o,OAR}$ is a wavelength parameter for the optically active material, and $\lambda_{o,FR}$ is the wavelength parameter for the Faraday rotator. Therefore, to achieve good isolation, the second or output polarizer needs to be rotated an angle δ ($\delta = \Theta_{OAR} + \tfrac{1}{4}\pi$) with respect to the orientation of the polarization of the first polarizer. When these conditions are satisfied, the isolation provided is fairly constant over a large wavelength range (FIG. 3). From FIG. 3 it is noticed that a conventional Faraday isolator achieves isolation for only a narrow wavelength range.

The above discussion is given in order to determine the proper length for the optically active rotator. Equations 2 and 4 can be used to determine this length by accurately measuring $\lambda_{o,OAR}$ and $\lambda_{o,FR}$. Since a good fit of the data over a factor of 2 change in wavelength is possible only to a 1% accuracy, the prediction of isolation is limited to 40 dB. There are many other methods for determining the length of the optically active rotator, such as accurately measuring $\Theta_{FR} - \Theta_{OAR}$ as a function of wavelength and using this measured quantity to scale the length of the optically active rotator.

In general, eqn. 3 will not be identically zero because of variances in production and for other reasons. However by setting:

$$\lambda \frac{d(\Theta_{FR} - \Theta_{OAR})}{d\lambda} < \Xi \tag{5}$$

where Ξ is an isolation dependent constant, then the isolation over a wide wavelength range will still be high. The following table demonstrates the relationship between isolation, wavelength range, and Ξ. If the inequality of eqn. 5 is satisfied for the value of Ξ as shown in the third column of the table, then the amount of isolation, as shown in the first column of the table, is expected over the wavelength range shown in the second column of the table. This table assumes that the linear dispersion of $\Theta_{FR} - \Theta_{OAR}$ dominates other effects.

| Isolation (dB) | Wavelength range as % of central wavelength | Ξ |
| --- | --- | --- |
| 30 | 30–40 | 0.6 |
| 40 | 20 | 0.4 |
| 50 | 13 | 0.2 |
| 60 | 9 | |

Further, in order to achieve maximum isolation, the misalignment of the optical axis and the direction of light propagation in the birefringent optically active rotator must be minimized. The reason for this is that if the light propagation is misaligned from the optic axis by an angle Φ, the light separates into an ordinary ray of index of refraction $\eta_o$ and an extraordinary ray of index of refraction $\eta_{e'}$, where $\eta_{e'}$ is given by the expression:

$$\eta_{e'} = \sqrt{\{(SIN^2\ \Phi)/\eta_{e2} + (COS^2\ \Phi)/\eta_{o2}\}} \tag{6}$$

When Φ is small ($\Phi << 1$), and the birefringence ($\Delta\eta = \eta_{e'} - \eta_o$) is small, the extraordinary index is approximated by the expression:

$$\eta_{e'} = \eta_o + \Phi^2 (\eta_e - \eta_o)(\eta_e + \eta_o)/2\eta_e \approx \eta_o + \Phi^2 (\eta_e - \eta_o) \tag{7}$$

The birefringence causes the optically active material to act as a waveplate, so that even if the light is initially polarized as either an ordinary or extraordinary ray, the optical activity rotates this polarization so that the light transmitted through the material is not linearly polarized. The fraction of intensity (f) transmitted in the backward direction as the result of any waveplate between crossed polarizers is given by the expression:

$$f = SIN^2(\pi\Delta\eta L/\lambda) = ((\pi(\eta_e - \eta_o)L/\lambda)^2 \Phi^4 \tag{8}$$

For example, to achieve 40 dB of isolation ($f = 10^{-4}$) using quartz as the optically active rotator, the misalignment must be less that 0.5°. Since the field of view through a Faraday isolator is typically 10°, the tolerance is fairly tight and limiting apertures or field stops may be required.

Other considerations limiting the isolation achievable with the Faraday isolator include imperfections within the Faraday rotator, depolarization by the optical elements, polarizer rejection, surface parallelism and surface reflections. Considering each of these separately, imperfections in the Faraday rotator usually are magnetic field non-uniformity across the aperture and residual birefringence. Magnetic field non-uniformity causes light passing through the Faraday rotator to be rotated differently depending through which portion of the aperture the light has passed. This non-uniformity should be limited to 3% across the face of the aperture to obtain 40 dB isolation and can be achieved for 2 mm apertures. Residual birefringence results from stresses either induced in the Faraday material during the cooling of the melt or during the mounting of the material within the magnet. The residual birefringence should be less than $10^{-6}$ to achieve 40 dB isolation.

As mentioned previously, polarizer rejection can limit the isolation obtainable. Two polarizers with 34 dB rejection against the wrong polarization would restrict the Faraday isolator to 31 dB isolation, while polarizers having 50 dB rejection would permit the same isolator to reach 47 dB or be limited by the Faraday rotator. Each of the components of the isolator which cause the polarization vector of the light to rotate must have parallel surfaces to achieve uniform polarization rotation. Otherwise, light passing through one side of the aperture will travel further than light passing through the opposite side of the aperture and be rotated more. If the element of length L is wedge shaped, the surfaces being at a wedge angle $\phi$, then the fraction of the light intensity f, transmitted over the aperture of radius R is given by the expression:

$$f = (R\Theta\phi/L)^2 \qquad (9)$$

To achieve isolation of 40 dB, the surfaces should be parallel to within 0.5°.

Finally, since even broadband anti-reflection coatings give about 0.1% reflection, the three surfaces before the Faraday rotator material produce a 0.3% back reflection reducing the isolation to 25 dB. If 0.3% back reflection is a problem, tilting the isolator and spatially filtering the off axis reflection will reduce the problem. The tilting of any element to remove reflections can not exceed the limits previously discussed concerning misalignment.

Since Faraday rotation is inversely dependent upon temperature, it is necessary to stabilize the temperature of the isolator to $\mp 3°$ C. to achieve isolation better than 40 dB. The temperature dependence of the optically active rotator is more than an order of magnitude smaller than the dependence of the Faraday rotator on temperature and so can be disregarded. However, this means that the dispersion compensated isolator has temperature dependence which is no different than the conventional isolator. It should be noted that some Faraday isolators at wavelengths greater than 1 $\mu$m have a smaller than inverse temperature dependence and so isolators could be temperature and wavelength independent in the infrared region of the spectrum.

To illustrate the isolation possible in using the previously described relationships, consider a dispersion compensated Faraday isolator constructed using a Hoya ™ FR-5 glass Faraday rotator, an optically active quartz rotator and two polarizers. Hoya glass is a useful Faraday rotator in the visible and near infrared regions of the spectrum. Optically active quartz has a very high transmission from the ultraviolet through the infrared. Together these materials are suitable for constructing a dispersion compensated isolator for use in the visible and near infrared regions of the spectrum.

At wavelengths near 780 nm, $\lambda^* = 140$ nm for quartz and 300 nm for Hoya glass. Using the equation for $\Theta_{OAR}$ and the preceding values, a quartz crystal should be 0.420 cm in length to provide the 50.8° rotation necessary to achieve broadband isolation. The polarizers, in this embodiment are placed at 95.8° with respect to one another to achieve the best isolation at both ends of the wavelength range.

The polarizers are set for a minimum transmission at 780 nm. When properly aligned, the transmission in the reverse direction is less than $10^{-3}$ from 735 nm to 870 nm, while the forward transmission is better than 80% over the wavelength range. The reverse transmission corresponds to an isolation greater than 30 dB . The isolation was achieved without tuning. Conversely, a conventional, non-dispersion compensated Faraday isolator would have provided at least 30 dB of isolation but only over a 30 nm wavelength range.

Figure 4:
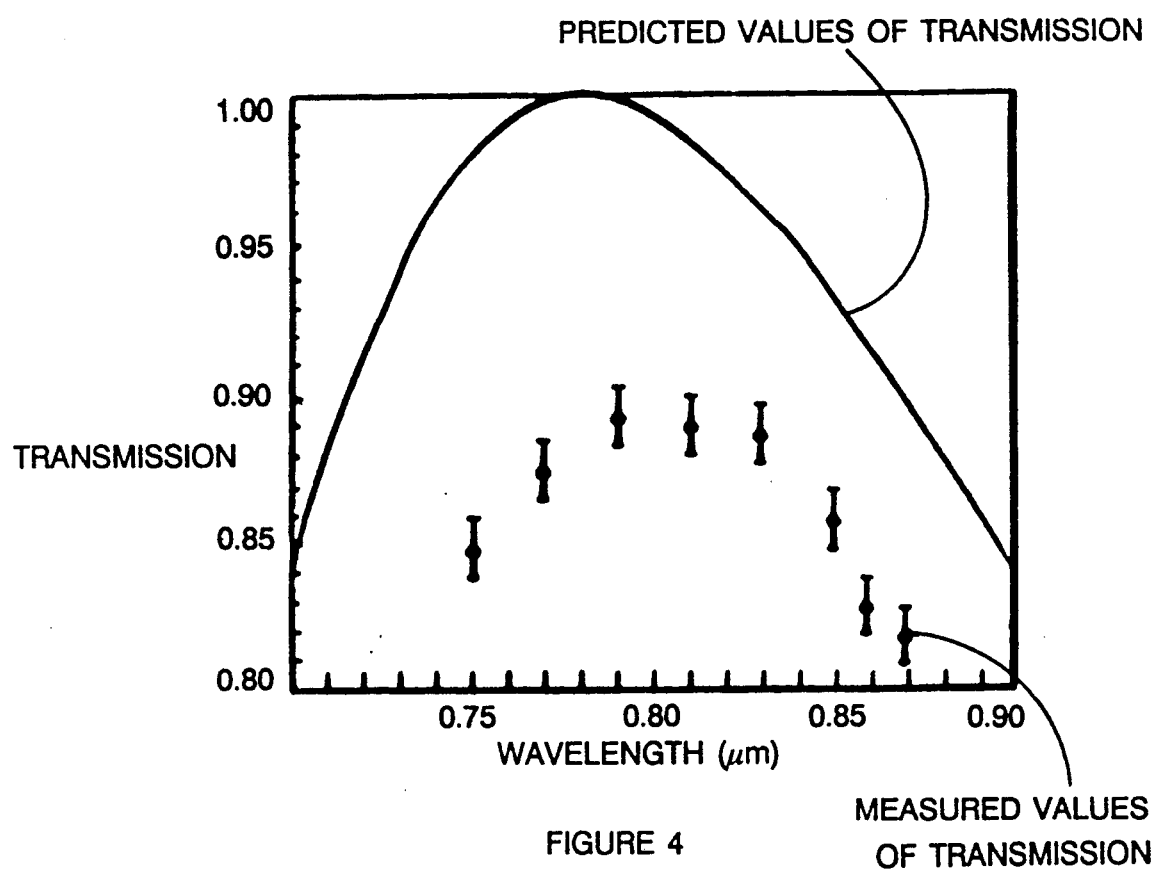
FIG. 4 is a comparison of predicted and measured transmission versus wavelength curves for the invention.

It is the forward transmission losses through the broadband Faraday isolator which can limit its usable wavelength range. The maximum forward transmission of the isolator just described is about 90% as a result of losses at the optical surface. The minimum transmission is 81% or equal to a 0.9 dB loss (FIG. 4). The discrepancy between the predicted and measured values of the transmission as shown in FIG. 4 results from losses at the anti-reflection coated surfaces.

Using the methods described herein, a Faraday isolator providing at least 30 dB of isolation and less than a 50% forward loss over the entire visible range of 430 nm to 670 nm without tuning can be made using a 51° quartz rotator and a 45° Hoya FR-5 Faraday rotator at 500 nm. Similarly, a Faraday isolator providing 60 dB of isolation from 760 nm to 845 nm using a 50.8° quartz rotator and a Hoya FR-5 Faraday rotator producing a 45° rotation at 780 nm. An isolator having more than 37 dB isolation between 1.1 $\mu$m. and 1.4 $\mu$m. is also possible by using a 31.4° quartz rotator and a 45° YIG Faraday rotator at 1.2 $\mu$m. In each case the isolation of the range of wavelengths is accomplished without tuning.

Other embodiments are within the following claims.
What is claimed is:
1. An optical isolator for isolating a light source from reflections, comprising
   a first polarizer configured to accept light travelling in a forward direction from said light source, said first polarizer having an axis of polarization in a first orientation;
   a Faraday rotator and an optically active rotator,
      one of said rotators being configured to rotate the polarization of said forward travelling light from said first orientation to a second orientation, said second orientation being at a first angle relative to said first orientation,
      the other of said rotators being configured to rotate the polarization of said light in said second orientation into a third orientation, said third orientation being at a second angle relative to said second orientation; and
   a second polarizer positioned to accept the output of said rotators, said second polarizer having an axis of polarization aligned with said third orientation, wherein said optically active rotator compensates for the dispersion of said Faraday rotator to produce isolation over a wavelength range about a central wavelength, said compensation being achieved by configuring said optically active rotator and said Faraday rotator so that (i) said first and said second angles are different and (ii) the slope of said Faraday rotator's dispersion curve at said central wavelength is approximately identical to the slope of said optically active rotator's dispersion curve at said central wavelength.

2. The apparatus of claim 1 wherein said optically active rotator compensates for the dispersion of said Faraday rotator to produce isolation greater than 30 dB over a wavelength range of more than 10% of said central wavelength.

3. The apparatus of claim 1 wherein said optically active rotator compensates for the dispersion of said Faraday rotator to produce isolation greater than 40 dB over a wavelength range of more than 5% of said central wavelength.

4. The apparatus of claim 1 wherein the orientation of said Faraday rotator and said optically active rotator is such that the net polarization rotation of light propagating in the reverse direction, through the combination of said optically active rotator and said Faraday rotator, is independent of wavelength over a wavelength range of more than 10% of said central wavelength.

5. The apparatus of claim 4 wherein said range of wavelengths over which said isolator is to be wavelength independent is from 735 nm to 870 nm.

6. The apparatus of claim 5 wherein the optically active material is quartz and produces an angle of rotation of polarization, $\Theta_{OAR}$, of 50.8° at 780 nm.

7. The apparatus of claim 4 wherein said range of wavelengths over which said isolator is to be wavelength independent is from 1.1 $\mu$m to 1.4 $\mu$m with isolation in excess of 37 dB.

8. The apparatus of claim 7 wherein the Faraday rotator is YIG.

9. The apparatus of claim 8 wherein the optically active material is quartz and produces an angle of rotation of polarization, $\Theta_{OAR}$, of 31.4° at 1.2 $\mu$m.

10. The apparatus of claim 1 wherein the slope of said Faraday rotator's dispersion curve at said central wavelength and the slope of said optically active rotator's dispersion curve at said central wavelength are sufficiently identical that $\Xi$, an isolation dependent constant, is less than or equal to 0.6.

* * * * *